United States Patent
Takagi et al.

(10) Patent No.: US 6,940,695 B2
(45) Date of Patent: Sep. 6, 2005

(54) HEAD SUSPENSION FOR DISK DRIVE, AND SEMI-FINISHED SUSPENSION

(75) Inventors: Yasuil Takagi, Yokohama (JP); Takeshi Kamisaku, Kanazawa-Ku (JP)

(73) Assignee: NHK Spring Co., Ltd., Yokohama (JP)

( * ) Notice: Subject to any disclaimer, the term of this patent is extended or adjusted under 35 U.S.C. 154(b) by 161 days.

(21) Appl. No.: 10/411,662

(22) Filed: Apr. 11, 2003

(65) Prior Publication Data

US 2004/0068859 A1 Apr. 15, 2004

Related U.S. Application Data

(62) Division of application No. 09/811,077, filed on Mar. 16, 2001, now Pat. No. 6,571,455.

(30) Foreign Application Priority Data

Oct. 30, 2000  (JP) .......................................... 2000-331445

(51) Int. Cl.[7] .............................. G11B 5/48; G11B 21/16
(52) U.S. Cl. .................................. 360/244.2; 29/603.03
(58) Field of Search ............................ 360/244.2, 244.8, 360/244.9, 245, 245.2, 245.3, 245.4; 29/603.03

(56) References Cited

U.S. PATENT DOCUMENTS

| | | | | | |
|---|---|---|---|---|---|
| 4,167,765 A | * | 9/1979 | Watrous | .................. | 360/245.3 |
| 4,991,045 A | * | 2/1991 | Oberg | ....................... | 360/244.3 |
| 5,381,289 A | * | 1/1995 | Fiedler | .................... | 360/244.2 |
| 5,920,444 A | * | 7/1999 | Heeren et al. | ........... | 360/245.2 |
| 6,313,971 B1 | * | 11/2001 | Takagi et al. | ............. | 360/245.2 |
| 6,710,978 B2 | * | 3/2004 | Holaway et al. | ......... | 360/245.2 |

FOREIGN PATENT DOCUMENTS

JP  9-128726  *  5/1997

* cited by examiner

*Primary Examiner*—Angel Castro
(74) *Attorney, Agent, or Firm*—Kilpatrick Stockton, LLP

(57) ABSTRACT

A semi-finished suspension (55) is used for manufacturing a head suspension (11) for a disk drive. The semi-finished suspension includes a base plate (37), a rigid part (27) solidly joined with the base plate through a bridge (57), and a protrusion being the bridge protruding from one of a base plate and rigid part and having a positioning hole (63) formed through the protrusion of the bridge. This positioning hole is aligned with a positioning hole (51) formed through part of a flexure (41).

1 Claim, 4 Drawing Sheets

HEAD SUSPENSION FOR DISK DRIVE, AND SEMI-FINISHED SUSPENSION

RELATED APPLICATIONS

This application is a divisional of U.S. application Ser. No. 09/811,077, entitled "Method of Manufacturing Head Suspension For Disk Drive and Semi-Finished Suspension," filed Mar. 16, 2001, issued as U.S. Pat. No. 6,571,455, which is incorporated herein by reference.

BACKGROUND OF THE INVENTION

1. Field of the Invention

The present invention relates to a method of manufacturing a head suspension for a disk drive incorporated in an information processing unit such as a personal computer.

2. Description of the Related Art

A hard disk drive (HDD) used for an information processing unit has magnetic or magneto-optical disks to write and read data and a carriage. The carriage is turned around a spindle by a positioning motor. The carriage is disclosed in, for example, U.S. Pat. No. 4,167,765. This carriage has arms, a head suspension attached to each arm, and a head attached to the suspension and having a slider.

When each disk in the HDD is rotated at high speed, the slider slightly floats above the disk and air bearings are formed between the disk and the slider.

FIG. 1 shows a typical suspension 101 of an HDD. The suspension 101 has a load beam 103. The load beam 103 is fixed to a base plate 105 by, for example, laser welding. The base plate 105 is fitted to a carriage arm of the HDD.

The load beam 103 consists of a rigid part 107 of L1 in length and a resilient part 109 of L2 in length. A flexure 111 is fixed to the rigid part 107 by, for example, laser welding. An end of the flexure 111 has a tongue 113 to which a slider 115 is attached. The tongue 113 is pushed by a dimple 117, which is formed at an end of the rigid part 107. Although the dimple 117 is depicted with a solid line in FIG. 1, it is actually on the back of the tongue 113.

The rigid part 107 is provided with positioning holes 121 and 125, and the flexure 111 is provided with positioning holes 123 and 127.

The holes 121, 123, 125, and 127 are set on positioning pins of a jig to align the rigid part 107 and flexure 111 with each other, and the rigid part 107 and flexure 111 are fixed to each other by, for example, laser welding. The positioning and fixing of the flexure 111 to the rigid part 107 determine the vibration characteristics of the suspension 101.

Disks of recent HDDs are designed to densely record data and revolve at high speed. It is required, therefore, to provide a suspension of improved vibration characteristics to carry out precision positioning of a head on an HDD disk surface.

To meet the requirement, the suspension 101 must be compact. Namely, the distance A between the dimple 117 and a fitting center of the base plate 105 must be short. The distance A, however, must sufficiently be long to secure a proper distance between the holes 121 and 125 for correct positioning of the flexure 111 with respect to the rigid part 107.

If the distance A is excessively shortened to improve vibration characteristics, the holes 121 and 125 will be too close to each other, thereby deteriorating positioning accuracy.

To solve this problem, FIGS. 2A to 2C show a head suspension 101A for a disk drive according to a prior art. This prior art forms a positioning hole 125 on the side of a base plate 105. Even if the distance A (FIG. 1) between a dimple 117 and a fitting center of the base plate 105 is short, a sufficient distance is secured between positioning holes 121 (123) and 125 (127) for correct positioning of a flexure 111 to a rigid part 107.

Formation of the suspension 101A will be explained. FIG. 2A is a plan view showing parts of the suspension 101A before assembly, and FIG. 2B is a plan view showing the parts after assembly. In FIG. 2A, the flexure 111 is provided with the positioning holes 123 and 127. The base plate 105 is fitted to a reinforcing plate 129. The reinforcing plate 129 is solidly joined with the rigid part 107 of a load beam 103 through a bridge 131, to form a semi-finished suspension 133. The rigid part 107 is provided with the positioning hole 121, and the reinforcing plate 129 with the positioning hole 125.

A resilient material 135 is used to form a resilient part 109 of the load beam 103. The resilient material 135 is placed over the rigid part 107 and reinforcing plate 129 and is fixed thereto by, for example, laser welding. Thereafter, the base plate 105 is fitted to the reinforcing plate 129 and is fixed thereto by, for example, laser welding.

The semi-finished suspension 133 with the resilient material 135 and base plate 105 is set on a jig by passing pins of the jig through the holes 121 and 125, and the flexure 111 is laid thereon by passing the jig pins passed through the holes 121 and 125 through the holes 123 and 127, respectively. This precisely positions the flexure 111 with respect to the rigid part 107 as shown in FIG. 2B.

The distance between the holes 121 (123) and 125 (127) is appropriate for precision positioning between the rigid part 107 and the flexure 111. Under this state, the flexure 111 is fixed to the rigid part 107 by, for example, laser welding.

Thereafter, the bridge 131 is cut off by, for example, a press, to complete the suspension 101A of FIG. 2C.

One problem of this prior art is to leave the peripheries of the holes 125 and 127 on the base plate 105, to cause a horizontal imbalance on the base plate 105. This imbalance deteriorates the vibration characteristics of the suspension 101A.

SUMMARY OF THE INVENTION

An object of the present invention is to provide a method of manufacturing a head suspension or a semi-finished suspension that is compact, secures a sufficient distance between positioning holes, and involves no base-plate imbalance.

In order to accomplish the object, a first aspect of the present invention provides a method of manufacturing a head suspension for a disk drive. The head suspension has a base plate to be supported by a carriage, a load beam including a rigid part resiliently supported by the base plate, to apply load onto a slider, and a flexure positioned and fitted to the load beam and having a read-write head. The method includes a first step of forming a semi-finished suspension having the base plate, the rigid part solidly joined with the base plate through a bridge, and a protrusion protruding from one of the base plate and rigid part and having a positioning hole to be aligned with a positioning hole formed through part of the flexure, a second step of fixing a resilient material to the base plate and rigid part of the semi-finished suspension so that the base plate may resiliently support the rigid part through the resilient material, a third step of aligning the positioning hole of the flexure with the positioning hole of the protrusion and fixing the flexure to the rigid part, and a fourth step of cutting off the positioning-hole-formed part of the flexure, the bridge, and the protrusion including the positioning hole.

The first aspect may form the positioning hole of the protrusion in the vicinity of the base plate, to secure a proper distance between the positioning hole and a positioning hole formed through the rigid part. This results in precisely positioning the flexure with respect to the rigid part and correctly fixing the flexure thereto. The first aspect cuts off the bridge, the protrusion having the positioning hole, and the positioning-hole-formed part of the flexure. As a result, the suspension manufactured from the semi-finished suspension has no positioning holes including their peripheries, to cause no horizontal imbalance and improve the vibration characteristics of the suspension. In addition, the suspension of the first aspect is compact to further improve the vibration characteristics thereof.

A second aspect of the present invention makes the bridge serve as the protrusion.

The second aspect forms the positioning hole to be aligned with the positioning hole of the flexure on the bridge that solidly joins the rigid part to the base plate. The second aspect provides the same effect as the first aspect.

A third aspect of the present invention forms, in the first step, the positioning hole through one of the protrusion and bridge in the vicinity of the base plate.

The third aspect secures a proper distance between the positioning hole on one of the protrusion and bridge and a positioning hole on the load beam, to correctly position the flexure with respect to the load beam.

A fourth aspect of the present invention provides, in the first step, one of the protrusion and bridge with a corner in the vicinity of the base plate and forms the positioning hole at the corner.

The fourth aspect secures a long distance between the positioning hole on one of the protrusion and bridge and a positioning hole on the load beam, to make the suspension compact and correctly position the flexure with respect to the load beam.

A fifth aspect of the present invention provides a semi-finished suspension used for manufacturing a head suspension for a disk drive. The head suspension has a base plate to be supported by a carriage, a load beam including a rigid part resiliently supported by the base plate, to apply load onto a slider, and a flexure positioned and fitted to the load beam and having a read-write head. The semi-finished suspension has the base plate, the rigid part solidly joined with the base plate through a bridge, and a protrusion protruding from one of the base plate and rigid part and having a positioning hole to be aligned with a positioning hole formed through part of the flexure.

The fifth aspect cuts off the bridge and protrusion so that the base plate may have no positioning holes and their peripheries. As a result, a suspension manufactured from the semi-finished suspension of the fifth aspect involves no horizontal imbalance and shows improved vibration characteristics.

A sixth aspect of the present invention makes the bridge serve as the protrusion.

The sixth aspect forms the positioning hole to be aligned with the positioning hole of the flexure on the bridge that solidly joins the rigid part to the base plate. The bridge is cut off in the last stage so that the base plate may have no positioning holes including the peripheries of the holes. As a result, a suspension manufactured from the semi-finished suspension of the sixth aspect involves no horizontal imbalance and shows improved vibration characteristics.

DESCRIPTION OF THE PREFERRED EMBODIMENTS

Figure 1:
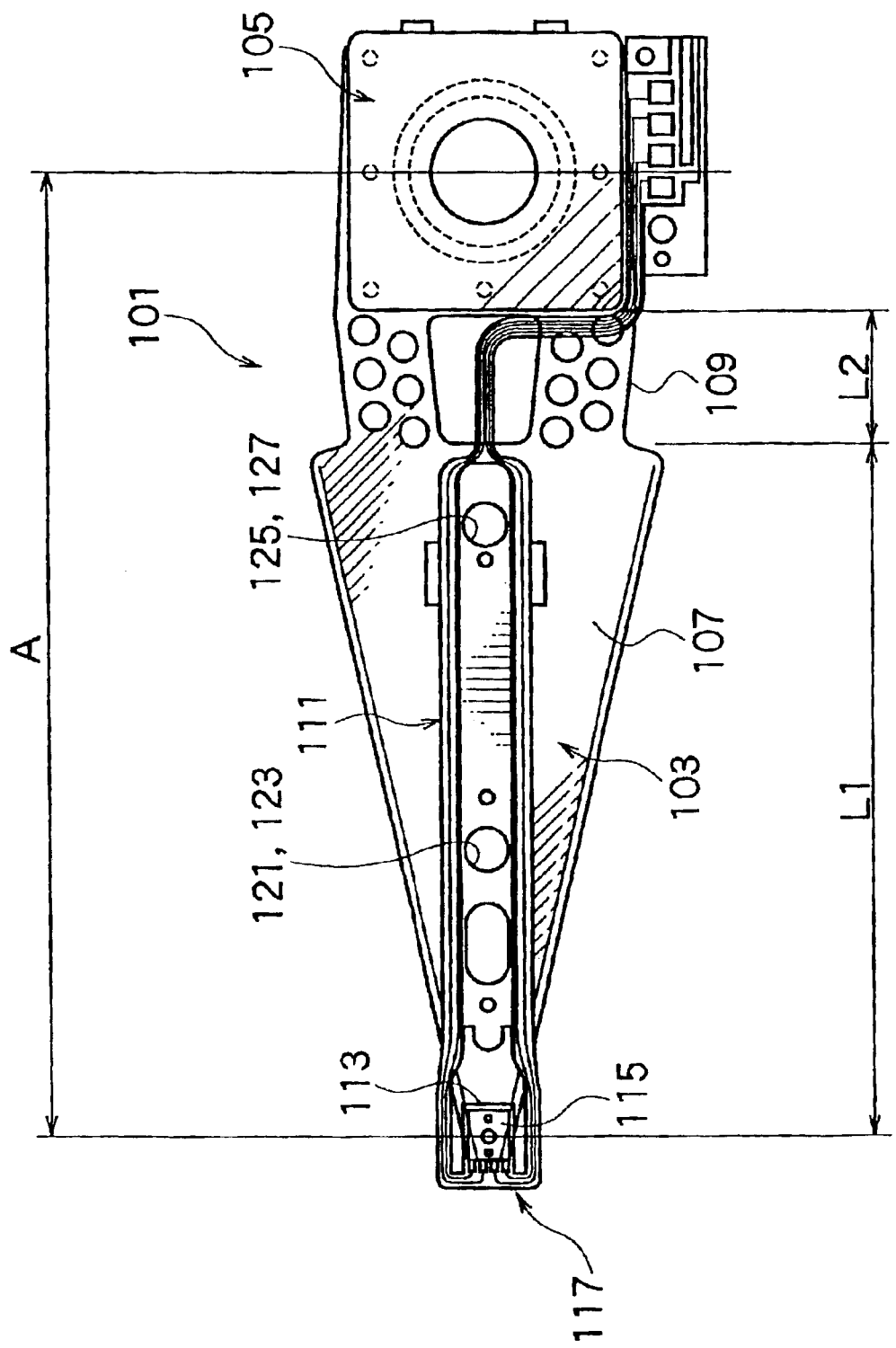
FIG. 1 is a plan view showing a head suspension for a disk drive according to a prior art.
Figure 2B:
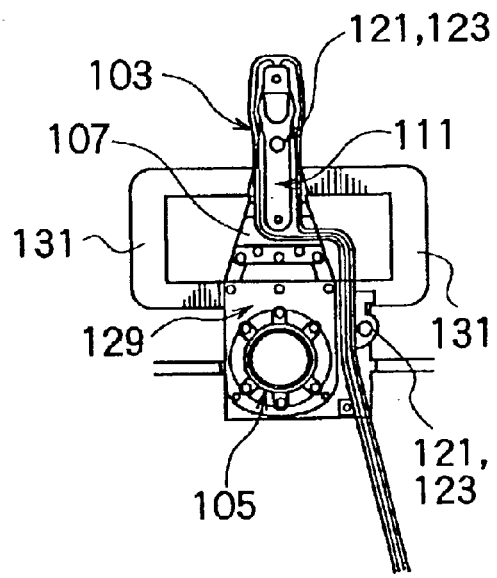
FIG. 2B is a plan view showing an assembled state of the parts of FIG. 2A.
Figure 2A:
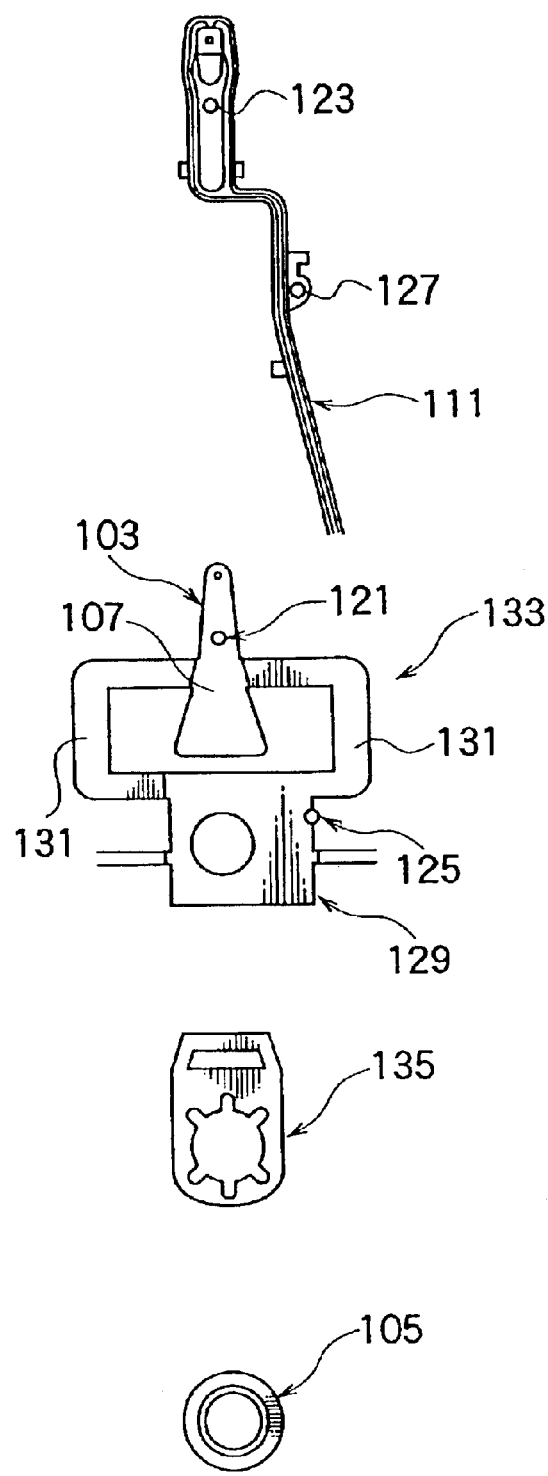
FIG. 2A is a plan view showing parts of a head suspension for a disk drive before assembly according to a prior art.
Figure 2C:
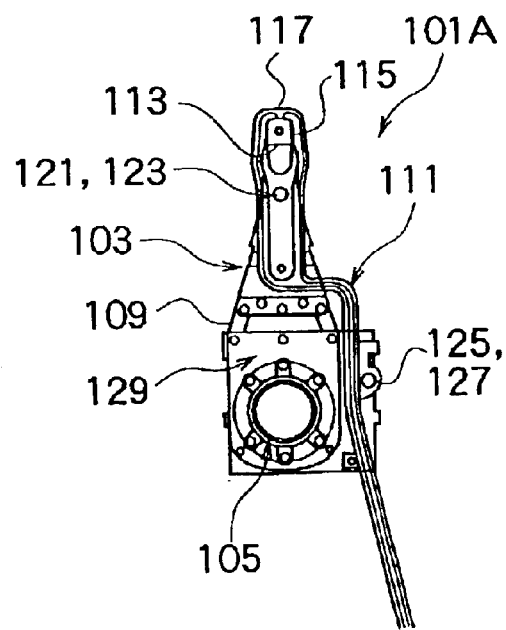
FIG. 2C is a plan view showing a finished suspension formed from the assembled parts of FIG. 2B.
Figure 3:
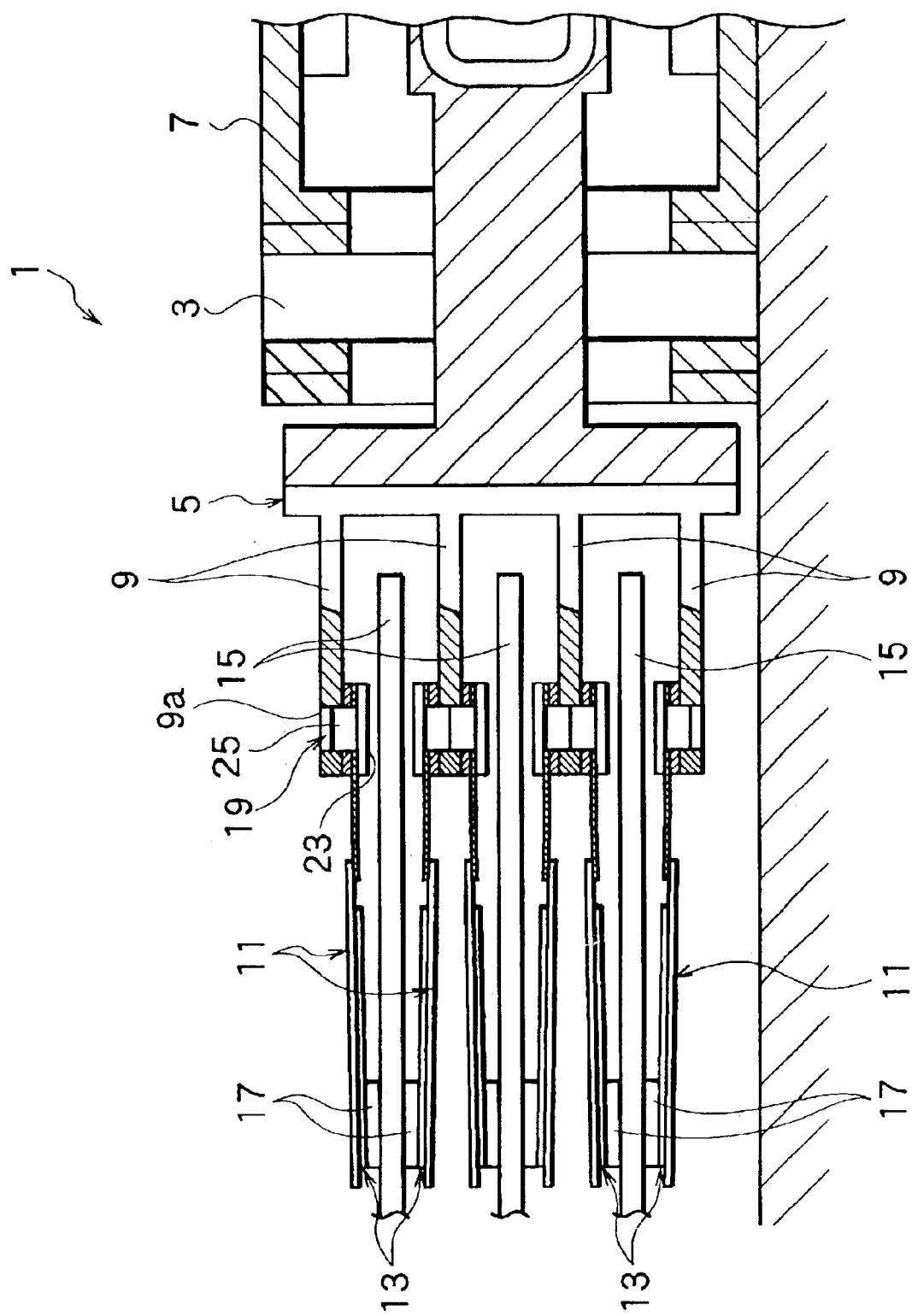
FIG. 3 is a sectional view partly showing an HDD having head suspensions according to an embodiment of the present invention.

FIG. 3 is a sectional view partly showing an HDD having head suspensions according to an embodiment of the present invention. The HDD 1 has a carriage 5 that is turned around a spindle 3 by a positioning motor 7 such as a voice coil motor.

The carriage 5 has a plurality of (four in FIG. 3) arms 9 each having the suspension 11 of the present invention. The suspension 11 has a write-read head 13.

The carriage 5 is driven around the spindle 3 by the motor 7, to move the head 13 onto a required track on a disk 15.

The head 13 has a slider 17 to face a track on the disk 15, and the slider 17 has a transducer (not shown). When the disk 15 is revolved at high speed, air enters between the slider 17 and the disk 15 to form air bearings between them to slightly float the slider 17 above the disk 15.

The present invention is characterized by removing positioning holes from the suspension 11 before completing the manufacturing of the suspension 11. First, the structure of the suspension 11 will be explained, and then, a method of manufacturing the same will be explained.

Figure 4A:
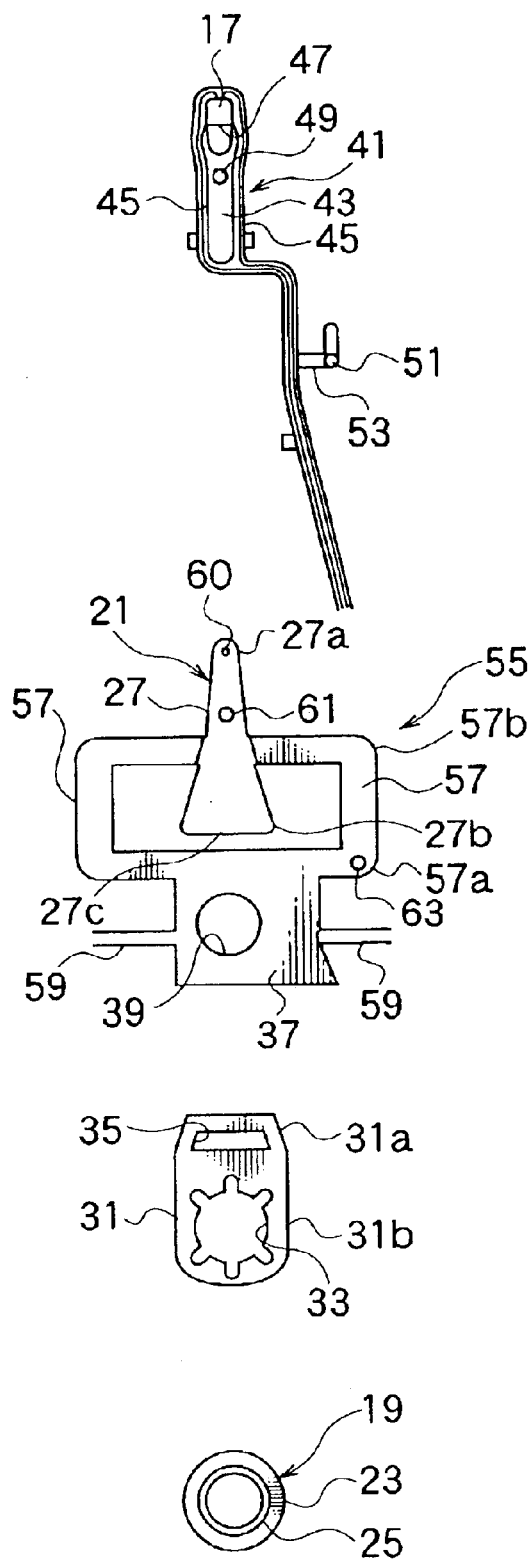
FIG. 4A is a plan view showing parts of the suspension of the first embodiment before assembly.
Figure 4B:
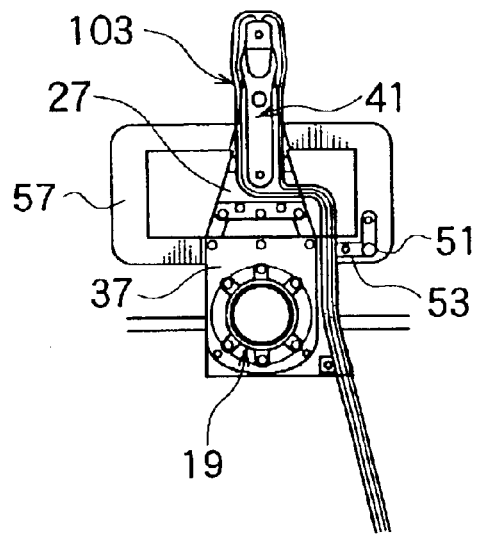
FIG. 4B is a plan view showing an assembled state of the parts of FIG. 4A.
Figure 4C:
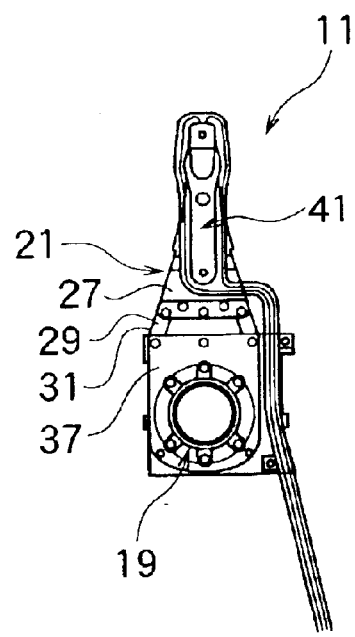
FIG. 4C is a plan view showing a finished suspension formed from the assembled parts of FIG. 4B.

FIGS. 4A to 4C show the details of the suspension 11, in which FIG. 4A is a plan view showing parts of the suspension 11 before assembly, FIG. 4B is a plan view showing an assembled state of the parts, and FIG. 4C is a plan view showing a finished state of the suspension 11.

The suspension 11 shown in FIG. 4C is compact and has a base plate 19 and a load beam 21. The base plate 19 is fitted to the carriage arm 9 (FIG. 3). Referring also to FIG. 4A, the base plate 19 is made of, for example, stainless steel and has a flange 23 and a boss 25. The flange 23 is circular in plan view. The boss 25 protrudes in the thickness direction of the flange 23. The boss 25 is fitted to a hole 9a of the arm 9.

The load beam 21 applies load onto the slider 17 and consists of a rigid part 27 and a resilient part 29. The resilient part 29 is made of a resilient material 31 that is independent of the rigid part 27. The rigid part 27 is made of, for example, stainless steel. The rigid part 27 may be made of an alloy of light metal (lighter than Fe) such as aluminum (Al) and titanium (Ti), or synthetic resin to reduce weight and increase rigidity. Alternatively, the rigid part 27 may be made of layers of two or more materials including light metal such as aluminum and titanium, alloys of light metal, and other metals such as stainless steel.

The resilient material 31 has a rectangular shape and extends over the base plate 19 (reinforcing plate 37) and rigid part 27. The resilient material 31 is, for example, a thin stainless steel plate and has an accurate spring constant lower than that of the rigid part 27. The resilient material 31 has a hole 33 fitted to the boss 25 of the base plate 19. The diameter of the hole 33 is equal to or slightly larger than the diameter of the boss 25.

When the resilient material 31 is laid on the reinforcing plate 37, a side 31a of the resilient material 31 protrudes from the reinforcing plate 37. A rectangular opening 35 is formed through the side 31a by etching, precision press, etc. The opening 35 partially reduces the bending rigidity (spring constant) of the resilient material 31 and forms the resilient part 29 between the sides 31a and 31b. The side 31a overlaps a base end 27b of the rigid part 27 and is fixed thereto by laser welding, adhesives, etc. At this time, a front edge of the opening 35 is substantially on a rear edge 27c of the rigid part 27.

The hole 33 of the resilient material 31 is fitted to the boss 25 of the base plate 19, so that the side 31b overlaps the flange 23. Namely, the side 31b is sandwiched between the flange 23 and the reinforcing plate 37. The reinforcing plate 37 and the base plate 19 commonly serve as a base plate to be attached to the carriage arm 9 (FIG. 3).

The reinforcing plate 37 is made of, for example, stainless steel and has a positioning hole 39. The hole 39 is made by, for example, etching to be precisely fitted to the boss 25 for correct horizontal positioning.

When the boss 25 is inserted into the hole 39, the side 31b of the resilient material 31 is sandwiched between the flange 23 and the reinforcing plate 37 and is fixed there by, for example, laser welding. In this state, a front edge of the reinforcing plate 37 is substantially on a rear edge of the opening 35 of the resilient material 31.

A flexure 41 is attached to the rigid part 27. The flexure 41 has a metal base 43 made of, for example, a thin resilient stainless steel rolled plate. An insulating layer is formed on the metal base 43, and a conductor 45 is formed on the insulating layer. An end of the conductor 45 is connected to a terminal of the head 13 and the other end thereof is connected to an external terminal (not shown). The flexure 41 is fixed to the rigid part 27 by laser welding, adhesives, etc. The flexure 41 has a tongue 47 to which the slider 17 of the head 13 is attached.

The suspension 11 of the structure mentioned above is fixed to the carriage dim 9 of FIG. 3. More precisely, the boss 25 is inserted into the hole 9a of the arm 9 and is plastically widened by a jig, to fix the suspension 11 to the arm 9.

The flange 23 of the base plate 19 is opposite to the arm 9 with the resilient material 31 interposing between them, to secure a gap between the load beam 21 and the disk 15. Namely, the suspension 11 is compact, and at the same time, is capable of securing a sufficient inclination angle for the load beam 21 with respect to the disk 15.

Since the rigid part 27 and resilient part 29 (i.e., the resilient material 31) that form the load beam 21 are discrete, they can be made of different materials with different thicknesses. As a result, requirements such as high rigidity for the rigid part 27 and a low spring constant for the resilient material 31 can simultaneously be met.

The resilient material 31 may be made of precision rolled material to provide a stable low spring constant. The resilient material 31 is sandwiched between the flange 23 and the reinforcing plate 37 both being thicker than the resilient material 31. As a result, the resilient material 31 is stably supported by the base plate 19, and the rigid part 27 is stably and resiliently supported by the base plate 19 through the resilient material 31.

A method of manufacturing the suspension 11 of the present invention will be explained.

The flexure 41 is provide with positioning holes 49 and 51 in advance. The hole 49 is formed close to the tongue 47, and the hole 51 is formed through a protrusion 53 protruding from the metal base 43. The protrusion 53 has a hooked shape so that is may stably be set on a bridge 57 of a semi-finished suspension 55.

A first step of the method forms the semi-finished suspension 55 by, for example, etching. The semi-finished suspension 55 consists of the rigid part 27 and reinforcing plate 37 that are connected to each other through the bridge 57. The bridge 57 has a rectangular shape in plan view and has a corner 57a on the reinforcing plate 37 side and a corner 57b on the rigid part 27 side. The reinforcing plate 37 is connected to a scrap area (not shown) through legs 59. Namely, many rigid parts 27 and reinforcing plates 37 are chained in rows and connected to the scrap area.

A front end 27a of the rigid part 27 has a positioning hole 61, and the corner 57a of the bridge 57 has a positioning hole 63. In this embodiment, the bridge 57 serves as a protrusion provided for the reinforcing plate 37 (serving as part of the base plate) or the rigid part 27. The front end 27a has a dimple 60.

The scrap area connected to many rigid parts 27 and reinforcing plates 37 has positioning holes, which are set on positioning pins of a jig. At this time, other positioning pins of the jig are inserted into the positioning holes 61 and 63 of each semi-finished suspension 55.

A second step of the method sets chained resilient materials 31 over the chained semi-finished suspensions 55 by passing the positioning pins of the jig through positioning holes of a scrap area of the chained resilient materials 31.

Each base plate 19 is set on each resilient material 31, and the boss 25 is passed through the hole 33 and fitted to the hole 39. In FIGS. 4A to 4C, the base plate 19 resilient material 31, and reinforcing plate 37 are laid in this order from the bottom, and are fixed together by, for example, laser welding.

A third step of the method passes the jig pins through the positioning holes 49 and 51 of the flexure 41 and the positioning holes 61 and 63 of the semi-finished suspension 55, to align the positioning holes with each other. As a result, the flexure 41 is correctly positioned with respect to the rigid part 27. At this time, the positioning hole 63 on the corner 57a of the bridge 57 is sufficiently distanced from the positioning hole 61 on the rigid part 27 even if the distance between the dimple 60 and a fitting center of the base plate 19 is short to improve the vibration characteristics of the suspension 11. Due to the sufficient distance between the holes 61 and 63, the flexure 41 is correctly positioned and fitted to the rigid part 27.

Due to the correct positioning of the flexure 41, the finished suspension 11 shows improved vibration characteristics. The correctly positioned flexure 41 and rigid part 27 are fixed to each other by, for example, laser welding in the third step as shown in FIG. 4B.

A fourth step of the method cuts off the bridge 57 from the rigid part 27 and reinforcing plate 37, as well as the legs 59, to complete the suspension 11 of FIG. 4C.

The completed suspension 11 has no positioning hole 63 and the periphery thereof around the base plate 19, nor the positioning hole 51 and protrusion 53 around the flexure 41. As a result, the base plate 19 is horizontally balanced to greatly improve the vibration characteristics of the suspension 11.

In this way, the present invention secures a proper distance between the holes 61 and 63 for correct positioning of the flexure 41 to the rigid part 27 horizontally balances the base plate 19, and miniaturizes the suspension 11 as a whole. These effects synergistically work to improve the total vibration characteristics of the suspension 11.

The embodiment forms the positioning hole 63 on the corner 57a of the bridge 57. The hole 63 may be shifted from the corner. The bridge 57 may have any configuration if it can solidly connect the rigid part 27 and reinforcing plate 37 to each other. The bridge 57 is not always required to have the corners 57a and 57b. For example, the bridge 57 may have only the corner 57a and may be curved toward the rigid part 27 without a corner on the rigid part 27 side.

The embodiment forms the positioning hole 63 on the bridge 57. Instead, the hole 63 may be formed through a protrusion, which is separately formed from the bridge 57, to protrude from the reinforcing plate 37 or rigid part 27. In this case, the protrusion may have a corner in the vicinity of the reinforcing plate 37, and the positioning hole 63 may be formed through the corner to secure the distance between the hole 63 and the hole 61 on the rigid part 27. This protrusion is prepared with the semi-finished suspension 55.

The invention may be embodied in other specific forms without departing from the spirit or essential characteristics thereof. The embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A semi-finished suspension used for manufacturing a head suspension for a disk drive, the head suspension having a base plate to be supported by a carriage, a load beam including a rigid part resiliently supported by the base plate, to apply load onto a slider, and a flexure positioned and fitted to the load beam and having a read-write head, the semi-finished suspension comprising:

the base plate;

the rigid part solidly joined with the base plate through a bridge; and a protrusion being the bridge protruding from one of the base plate and rigid part and having a positioning hole formed through the protrusion of the bridge to be aligned with a positioning hole formed through part of the flexure.

* * * * *